(12) United States Patent
Doraiswamy et al.

(10) Patent No.: US 9,595,013 B2
(45) Date of Patent: Mar. 14, 2017

(54) DELEGATED AND RESTRICTED ASSET-BASED PERMISSIONS MANAGEMENT FOR CO-LOCATION FACILITIES

(75) Inventors: Vijaay Doraiswamy, Fremont, CA (US); Jaganathan Jeyapaul, San Jose, CA (US); Tsunyen Weng, San Mateo, CA (US); Nathan Janken, Dublin, CA (US); Mohan Navaratna, San Jose, CA (US); Brian James Lillie, Los Altos, CA (US)

(73) Assignee: Equinix, Inc., Redwood City, CA (US)

( * ) Notice: Subject to any disclaimer, the term of this patent is extended or adjusted under 35 U.S.C. 154(b) by 1679 days.

(21) Appl. No.: 12/964,658

(22) Filed: Dec. 9, 2010

(65) Prior Publication Data

US 2011/0145292 A1 Jun. 16, 2011

Related U.S. Application Data

(60) Provisional application No. 61/285,371, filed on Dec. 10, 2009, provisional application No. 61/323,066, filed on Apr. 12, 2010.

(51) Int. Cl.
| | |
|---|---|
| *G06F 17/30* | (2006.01) |
| *G06Q 10/06* | (2012.01) |
| *G06F 11/30* | (2006.01) |
| *G06F 21/60* | (2013.01) |

(Continued)

(52) U.S. Cl.
CPC ......... *G06Q 10/06* (2013.01); *G06F 11/3089* (2013.01); *G06F 21/604* (2013.01); *H04L 41/28* (2013.01); *H04L 41/5006* (2013.01); *G06F 11/3438* (2013.01)

(58) Field of Classification Search
CPC ................................. G06F 17/30902
See application file for complete search history.

(56) References Cited

U.S. PATENT DOCUMENTS

| | | |
|---|---|---|
| 6,515,224 B1 | 2/2003 | Pedro |
| 6,732,100 B1 | 5/2004 | Brodersen et al. |
| 6,971,029 B1 | 11/2005 | Avery, IV et al. |

(Continued)

FOREIGN PATENT DOCUMENTS

| | | |
|---|---|---|
| EP | 2510466 | 10/2012 |
| EP | 2510473 | 10/2012 |

(Continued)

OTHER PUBLICATIONS

International Search Report and Written Opinion of PCT/US10/59971, dated Feb. 11, 2011, 8 pages.

(Continued)

*Primary Examiner* — Mohammad S Rostami
(74) *Attorney, Agent, or Firm* — Shumaker & Sieffert, P.A.

(57) ABSTRACT

At least one user is designated to manage assets including management delegations, access restrictions, and access permissions. Management responsibilities are applied based on business rules and based on a hierarchical model. The hierarchical model enables a well-defined logical flow of delegations and restrictions with pruning capability. User groups, asset groups, asset trees and asset permissions may be defined. The designated user can manage a single asset or all assets or a subset of assets. An asset may belong to one or more asset groups.

19 Claims, 16 Drawing Sheets

(51) Int. Cl.
*H04L 12/24* (2006.01)
*G06F 11/34* (2006.01)

(56) References Cited

U.S. PATENT DOCUMENTS

| | | |
|---|---|---|
| 6,976,269 B1 | 12/2005 | Avery, IV et al. |
| 7,222,241 B2 | 5/2007 | Milgramm et al. |
| 7,385,529 B2 | 6/2008 | Hersh et al. |
| 7,441,004 B2 | 10/2008 | Lue Chee Lip et al. |
| 7,577,154 B1 | 8/2009 | Yung et al. |
| 7,987,269 B1 | 7/2011 | Mayhead et al. |
| 2002/0016757 A1* | 2/2002 | Johnson et al. ............ 705/36 |
| 2002/0049846 A1 | 4/2002 | Horen et al. |
| 2002/0143798 A1* | 10/2002 | Lisiecki et al. ............ 707/200 |
| 2003/0149781 A1 | 8/2003 | Yared et al. |
| 2003/0171977 A1* | 9/2003 | Singh et al. ............ 705/10 |
| 2003/0200222 A1* | 10/2003 | Feinberg et al. ............ 707/100 |
| 2003/0220975 A1 | 11/2003 | Malik |
| 2004/0010571 A1 | 1/2004 | Hutchinson et al. |
| 2004/0181544 A1 | 9/2004 | Anderson |
| 2004/0205116 A1 | 10/2004 | Pulier et al. |
| 2005/0028008 A1 | 2/2005 | Kumar |
| 2007/0050681 A1 | 3/2007 | DeRobertis et al. |
| 2007/0055765 A1* | 3/2007 | Lisiecki et al. ............ 709/223 |
| 2007/0192171 A1 | 8/2007 | Lotvin et al. |
| 2008/0004993 A1 | 1/2008 | Horspool et al. |
| 2008/0183717 A1* | 7/2008 | Singh et al. ............ 707/10 |
| 2008/0201454 A1 | 8/2008 | Soffer |
| 2009/0182896 A1 | 7/2009 | Patterson et al. |
| 2009/0216806 A1 | 8/2009 | Feuerstein et al. |
| 2009/0259768 A1* | 10/2009 | McGrath et al. ............ 709/241 |
| 2009/0276771 A1 | 11/2009 | Nickolov et al. |
| 2010/0088155 A1 | 4/2010 | Pyle et al. |
| 2010/0274366 A1* | 10/2010 | Fata et al. ............ 700/7 |
| 2010/0280911 A1* | 11/2010 | Roberts et al. ............ 705/21 |
| 2011/0072018 A1* | 3/2011 | Walls et al. ............ 707/737 |
| 2011/0145292 A1 | 6/2011 | Lillie et al. |
| 2011/0145903 A1 | 6/2011 | Doraiswamy et al. |

FOREIGN PATENT DOCUMENTS

| | | |
|---|---|---|
| WO | WO 2011/072270 | 6/2011 |
| WO | WO 2011/072271 | 6/2011 |

OTHER PUBLICATIONS

International Search Report and Written Opinion of PCT/US10/59970, dated Jan. 28, 2011, 9 pages.
Cross Reference to Related Applications Under 37 C.F.R. §1.78.
International Preliminary Report on Patentability for International Application No. PCT/US2010/059970 mailed Jun. 21, 2012, 7 pages. International Bureau of WIPO, Geneva, Switzerland.
International Preliminary Report on Patentability for International Application No. PCT/US2010/059971 mailed Jun. 21, 2012, 7 pages. International Bureau of WIPO, Geneva, Switzerland.
Non-Final Office Action for U.S. Appl. No. 12/964,629 mailed Jan. 9, 2013, 36 pages. U.S. Patent and Trademark Office, Alexandria, VA USA.
Final Office Action for U.S. Appl. No. 12/964,629 mailed Jul. 9, 2013, 37 pages. U.S. Patent and Trademark Office, Alexandria, VA USA.
Beulen, Erik, "IT Outsourcing Contracts: Practical Implications of the Incomplete Contract Theory," Proceedings of the 36th Hawaii International Conference on System Sciences, IEEE, 2002, 10 pgs.
Paschke et al. "Knowledge Representation Concepts for Automated SLA Management," Decision Support Systems 46, 2008, 19 pgs.
Extended European Search Report mailed Oct. 19, 2016 in corresponding EP Application No. 10836786.3, 10 pgs.

* cited by examiner

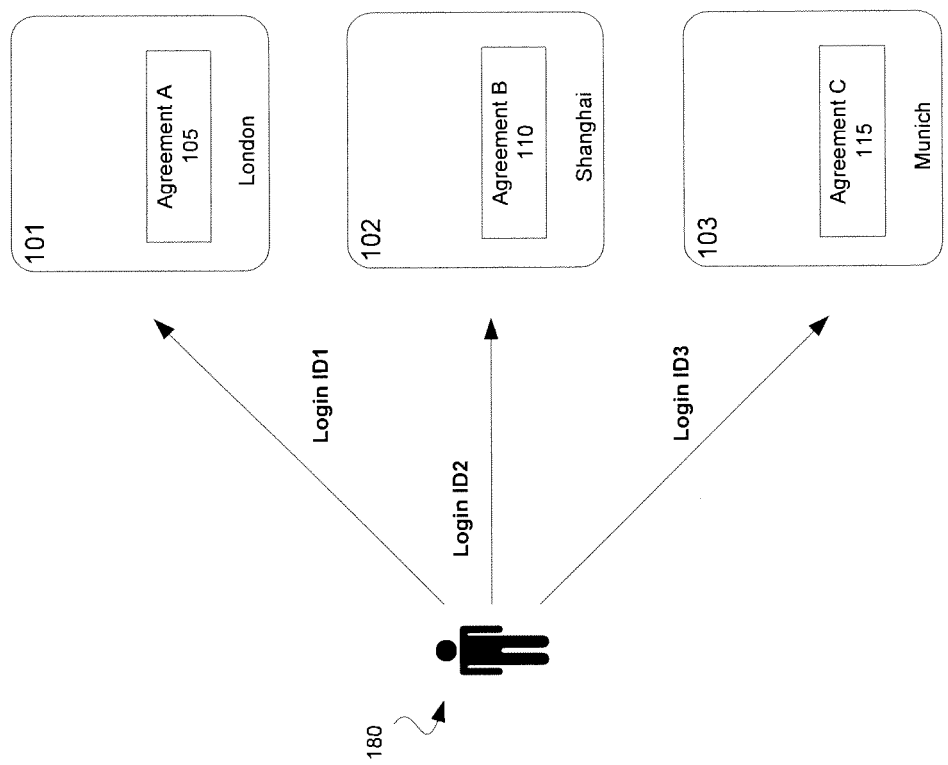

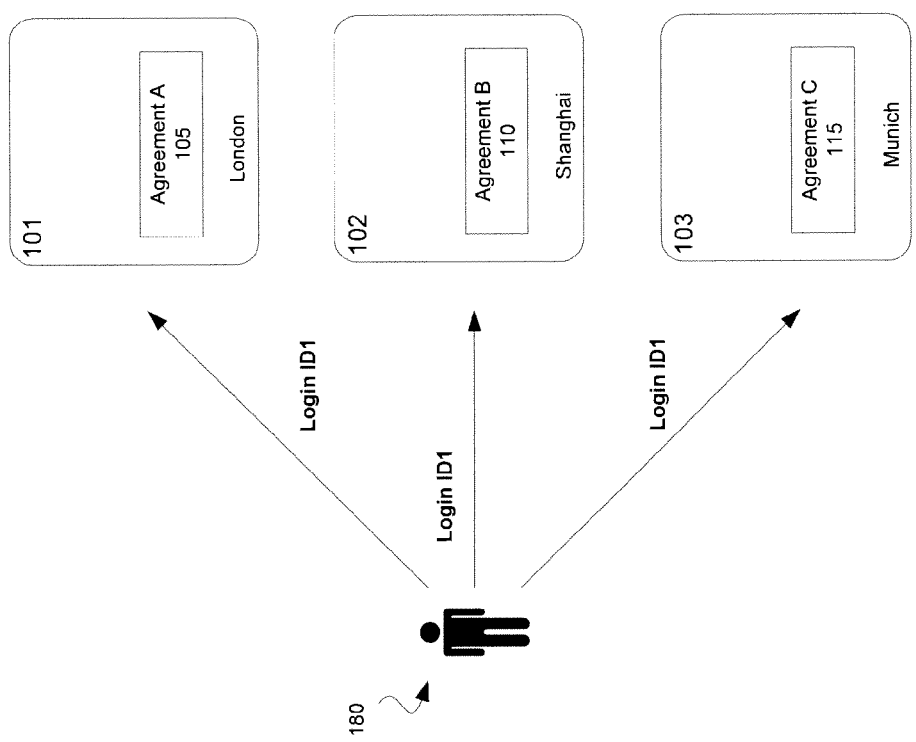

525 USER
- CUST_ORG_ID
- USER_ID
- FIRST_NAME
- LAST_NAME
- MIDDLE_NAME
- STATUS
- ACTIVATION_DATE
- INACTIVATION_DATE
- EMAIL
- CREATION_DATE
- CREATED_BY
- LAST_UPDATE_DATE
- LAST_UPDATED_BY
- WORK_PHONE
- CELL_PHONE
- EMAIL2
- FAX_NUMBER
- PIN
- TIMEZONE
- INACTIVATION_REASON
- TERMINATION_REASON
- ADMIN_ID
- TCA_CONTACT_ID
- LANGUAGE
- IS_NEW_USER
- ADDRESS_LINE1
- ADDRESS_LINE2
- CITY
- STATE
- COUNTRY
- ZIPCODE

520 ASSET GROUP
- NAME
- CUST_ORG_ID
- CREATION_DATE
- CREATED_BY
- LAST_UPDATE_DATE
- LAST_UPDATE_BY
- STATUS

535 PERMISSION
- PERMISSION_DESC
- CREATION_DATE
- CREATED_BY
- LAST_UPDATE_DATE
- LAST_UPDATE_BY
- STATUS

CUSTOMER ORGANIZATION 540
- OIM_ORG_ID
- NAME
- CREATION_DATE
- CREATED_BY
- LAST_UPDATE_DATE
- LAST_UPDATED_BY
- STATUS

515 USER GROUP
- UG_NAME
- CUST_ORG_ID
- CREATION_DATE
- CREATED_BY
- LAST_UPDATE_DATE
- LAST_UPDATED_BY
- STATUS

530 USER ASSET PERMISSION
- PERMISSION_CODE
- AT_NODE_ID
- CREATION_DATE
- CREATED_BY
- LAST_UPDATE_DATE
- LAST_UPDATED_BY
- NOTES_1
- NOTES_2
- USER_KEY

510 ASSET
- ASSET_NATURAL_KEY
- ASSET_TYPE
- ASSET_DISPLAY_VALUE
- PARENT_NODE_ID
- CREATION_DATE
- CREATED_BY
- LAST_UPDATE_DATE
- LAST_UPDATED_BY
- CUST_ORG_ID

545 AGREEMENT
- CUST_ORG_ID
- AGREEMENT_ID
- STATUS
- CREATION_DATE
- CREATED_BY
- LAST_UPDATE_DATE
- LAST_UPDATED_BY

FIG. 5

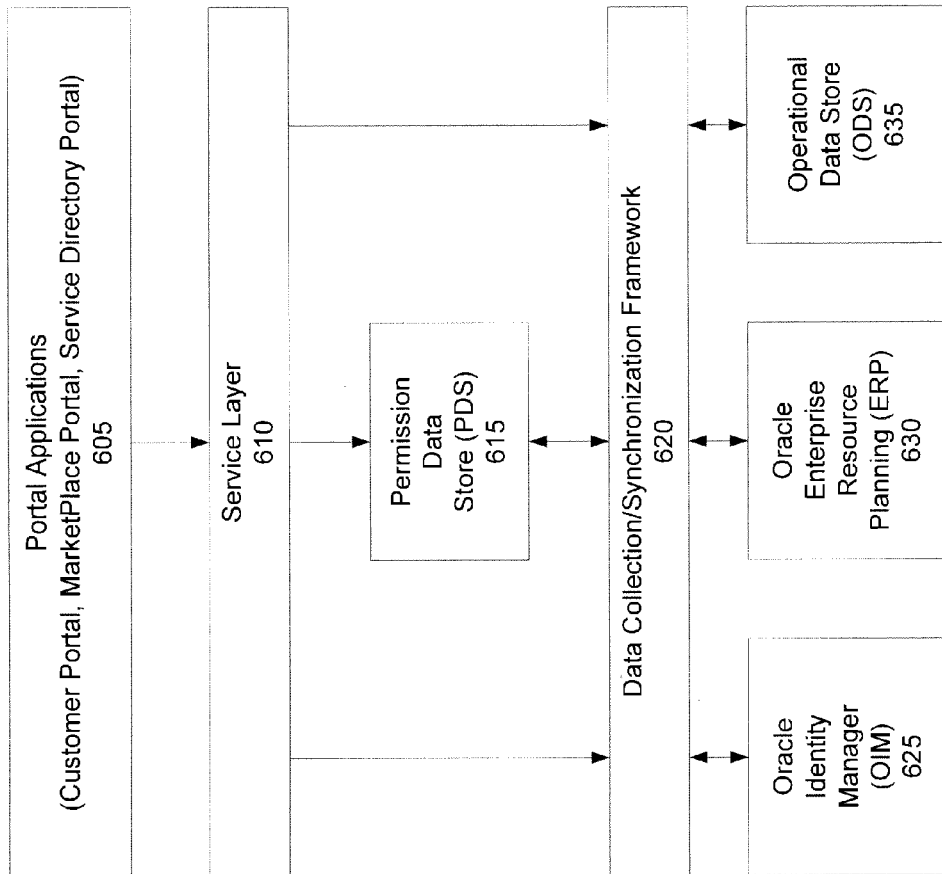

DELEGATED AND RESTRICTED ASSET-BASED PERMISSIONS MANAGEMENT FOR CO-LOCATION FACILITIES

RELATED APPLICATIONS

This application claims the benefit of and priority to U.S. Provisional Application titled "An Ethernet Exchange" filed on Dec. 10, 2009 having application Ser. No. 61/285,371 and U.S. Provisional Application titled "An Improved Ethernet Exchange" filed on Apr. 12, 2010 having application Ser. No. 61/323,066, both are incorporated by reference herein.

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD OF THE INVENTION

Embodiments of the invention generally relate to co-location facility. More particularly, an aspect of an embodiment of the invention relates to managing permissions relating to accessing assets.

BACKGROUND OF THE INVENTION

Global companies that support customers in many different regions generally have multiple agreements with the same customer. The agreements may be established at the regional level. Each agreement may be treated as a unique agreement with the customer with its own set of requirements, resources, etc., even if other agreements may have already been established with the same customer. This approach may be used either because it is a traditional business practice, or because it is the only way the underlying information system can support, or both. As the number of customer increases and/or the number of agreements per customer increases, the same approach can cause unnecessary overheads and costs for the global companies as well as for their customers.

SUMMARY OF THE INVENTION

A central relational database containing a permissions model for permissions management for the logical and physical assets associated with one or more geographically distinct co-location facilities, where the permissions model is configured so that a designated user on the customer side can be assigned to grant/revoke permissions to the individual users of their organization accordingly, and a separate user groups model to allow the organization to manage user groups and asset groups separately, a set of links to map the many to many relationship between the users in the created user groups and the permissions to use assets contained in the formed one or more asset groups, where a user interface is configured to allow the designated user to be designated as an administrator at the asset level, and that designated user is authorized to administer over one of a single asset group, all of the asset groups, and some subset of all of the asset groups.

BRIEF DESCRIPTION OF THE DRAWINGS

The drawings refer to embodiments of the invention in which:

FIG. 1C is a block diagram that illustrates an example embodiment of using different login IDs to access different assets; and FIG. 1D is a block diagram that illustrates an example embodiment of using a unified login ID to access different assets; FIG. 5 is a block diagram that illustrates an example embodiment of the database tables; and FIG. 6A is a block diagram that illustrates an example embodiment of an architecture that may be used.

Figure 1A:
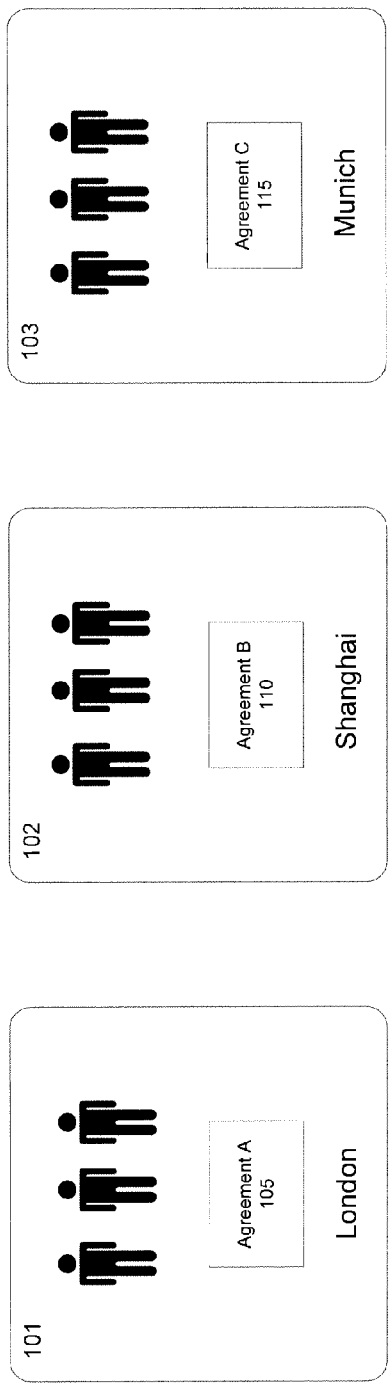
FIGS. 1A and 1B are block diagrams that illustrate example embodiments of a global customer having multiple agreements.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DESCRIPTION

For some embodiments, methods and systems are described to enable a service provider to more efficiently offer its services to customers that have global presence. The methods and systems extend user management capabilities to include asset based permission management. User groups, asset groups, asset trees and asset permissions may be defined. A central relational database containing a set of tables and schema may be used to store information relating to the user groups, asset groups, asset trees and asset permissions. The methods and systems enable a set of users (or employees) of the customers to be designated to manage assets including delegations, restrictions, permissions applied based on business rules and based on a hierarchical model. The hierarchical model enables a well-defined logical flow of delegations and restrictions with pruning capability. This is advantageous over the traditional approach where there is a lack of delegation and restriction based on the assets.

For some embodiments, the methods and systems implement Oracle E-Business Suite (EBS) from Oracle Corporation of Redwood Shores, Calif. and leveraging the Trading Community Architecture (TCA) from the Oracle EBS. Other applications from Oracle that may also be used by the methods and systems include Data Collection Advantage (DCA), Oracle Identity Manager (OIM), Oracle Internet Directory (OID), among others.

In the following description, numerous specific details are set forth, such as examples of specific data signals, components, connections, etc. in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method blocks. The required structure for a variety of these systems will appear from the description below.

Multiple Logins

Figure 1B:
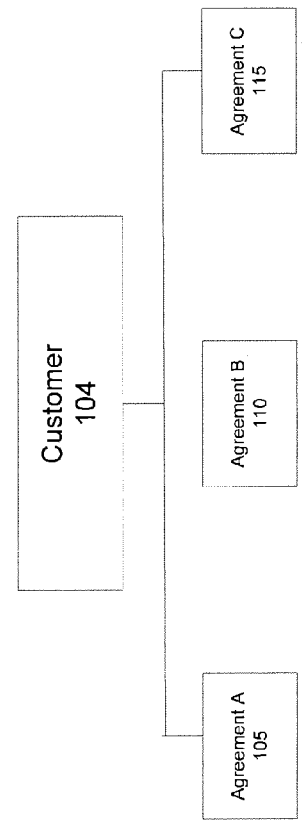

FIGS. 1A and 1B are block diagrams that illustrate example embodiments of a global customer having multiple agreements. A service provider may have multiple agreements with a customer, and each of the agreements may be associated with an asset (or resource) offered by the service provider. The asset may be geographically specific. Customer 104 may have many locations globally. For example, the customer 104 may have locations in London 101, Shanghai 102, and Munich 103, as shown in FIG. 1A. The customer 104 may be a customer of a service provider that also offers services in many geographical areas. For example, the service provider may be Equinix, Inc. of Redwood City, Calif. Since Equinix connects businesses with partners and customers around the world through a global platform of high performance data centers, Equinix can provide its data center services to customers at many different geographical areas. For example, Equinix may have a master service agreement (MSA) with the customer 104 to use the data center located in Munich, and Equinix may have another MSA with the customer 104 to use the data center located in London, etc. The term "service provider" is used to refer to a company such as Equity that provides services to customers. The term "customer" may be used to refer to a company that subscribes to the services offered by the service provider. The term "user(s)" refer to the employees of the customer who act as representatives of the customers and who are authorized to access the services offered by the service provider.

Referring to FIG. 1A, agreement A 105 may be associated with a data center in London 101, agreement B 110 may be associated with a data center in Shanghai 102, and agreement C 115 may be associated with a data center in Munich 103. In many environments, it may be necessary to have different groups from the same customer to have different agreements with the service provider, as compared to having one master agreement. This is because each agreement may be different in terms, services, etc. As shown in FIG. 1B, all three agreements 105, 110, 115 are with the same customer 104.

Typically, when a user needs to access the asset located in London 101, that user is assigned a user login by the service provider. When this same user wants to access an asset located in Shanghai 102, a different user login is assigned to the user by the service provider, and so on. This is illustrated in FIG. 1C where user 180 needs to use user login ID1 to access the asset located in London 101, user login ID2 to access the asset located in Shanghai 102, and user login ID3 to access the asset located in Munich 103. It may be noted that since the agreements 105, 110, and 115 are different, the user 180 may have different access permissions to the assets located in London 101, Shanghai 102 and Munich 103. When the number of agreements and the number of users increase, managing the user logins and their access to the assets can be very complex.

Unified Login

FIG. 1D is a block diagram that illustrates an example embodiment of using a unified login ID to access different assets. In this diagram, the user 180 is able to the same login ID1 to access the asset located in London 101, Shanghai 102, and Munich 103. To implement the unified login ID as illustrated in FIG. 1D, assets, asset groups, users, user groups, logical customer organization, permissions, etc. may be defined as follows.

Assets

An asset can be a physical asset or a logical asset. For example, a physical asset may be the data center, a particular rack in the data center, a conference room in the data center, a cabinet, cages, networks, etc. A logical asset may be user account information, permission information, or any other features and functionality that the user is allowed to be exposed to, as configured by the service provider under the terms of the agreement. For example, when the user 180 logs in to the data center in London using the login ID1, the user 180 will get visibility into the logical assets located in London 101. Similarly, when using the login ID2, the user 180 will get visibility into the logical assets located in Shanghai 102. A user may need to be able to access a physical asset such as a rack or cabinet to perform onsite operations. Although the examples above associate an agreement with a data center (at data center level), the agreement may also be associated with a region (region level). For example, a service provider such as Equinix may have two data centers in London 101, and an agreement with the customer 104 in London 101 may be applicable to both data centers.

Portal

The users may login and access the assets using a portal provided by the service provider. The users may use client computer systems and browser software to connect to a network such as the Internet in a client-server environment. The portal may provide options for the user to select the logical asset(s) that the user needs to access. For example, the portal may include a user interface that displays a list of logical assets offered by Equinix globally.

Depending on the asset, a user may need to use the right login ID to log into the portal and access the asset. The portal may be associated with a relational database where user account information may be stored. The relational database may also be configured to store other information associated with the users, agreements, assets, permissions, etc. The relational database may be associated with one or more database servers connected with the network. The relational database may be centralized and may be used to store information about all of the global assets associated with a service provider.

Logical Customer Organization Model

Figure 2:
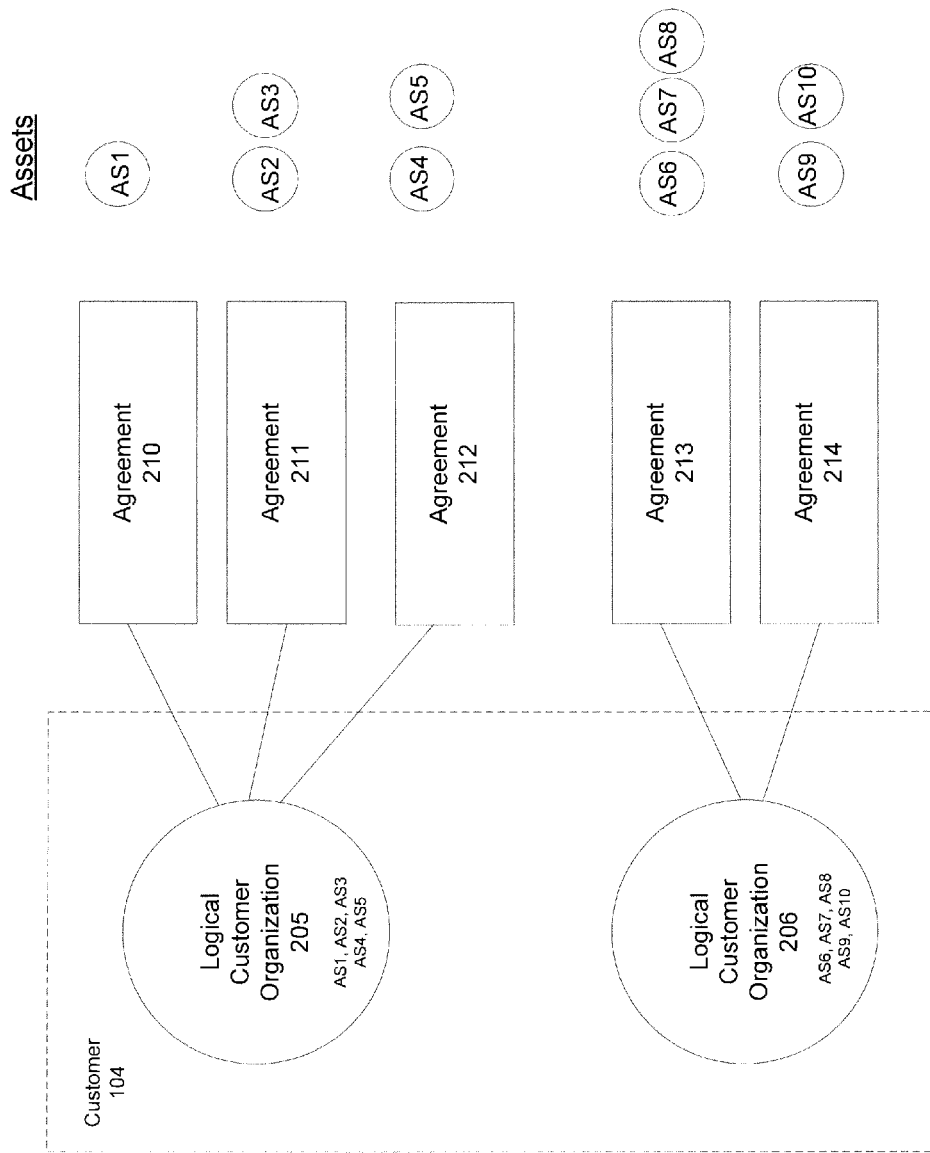
FIG. 2 is a block diagram that illustrates an example embodiment of groups of agreements.

FIG. 2 is a block diagram that illustrates an example embodiment of groups of agreements. For some embodiments, multiple agreements associated with the same customer may be grouped together to form groups of agreements. Each of the groups of agreements may be referred to as a logical customer organization. Thus, there may be many logical customer organizations for each actual customer organization. For example, the customer 104 may be associated with logical customer organizations 205 and 206. The logical customer organization 205 may be associated with agreements 210, 211, and 212, while the logical customer organization 206 may be associated with agreements 213 and 214. Further, since the agreements 211-213 are associated with assets AS1-AS5, the logical customer organization 205 is also associated with the assets AS1-AS5. Similarly, the logical customer organization 206 is associated with the assets AS6-AS10. For some embodiments, the grouping of the agreements into logical customer organizations is established based on input provided by the customers.

For some embodiments, the users assigned to a logical customer organization are the users who may have visibility to the assets associated with that logical customer organization. Each of these users may be kept track of based on their user profiles as established with the portal. The profile may include, for example, first name, last name, email address, etc. An organization profile may also be maintained for each logical customer organization. For example, the organization profile may include the user profiles mentioned above as well as their asset permissions. The groupings may be region-based, organization-based, departmental-based, or in any ways that the customers wish to group them.

The agreements assigned to a logical customer organization may be changed over time. For example, an expired agreement may be removed, and a new agreement may be added. For some embodiments, when a new agreement is added to the logical customer organization, new user profiles may be added to the organization profile. The portal may be used to add new user profiles to the organization profile. New login IDs may be created. Some existing login IDs may be updated. Similarly, when an expired agreement is removed, the organization profile may be updated using the portal, and some existing login IDs may be removed.

Local Administrators

Figure 3:
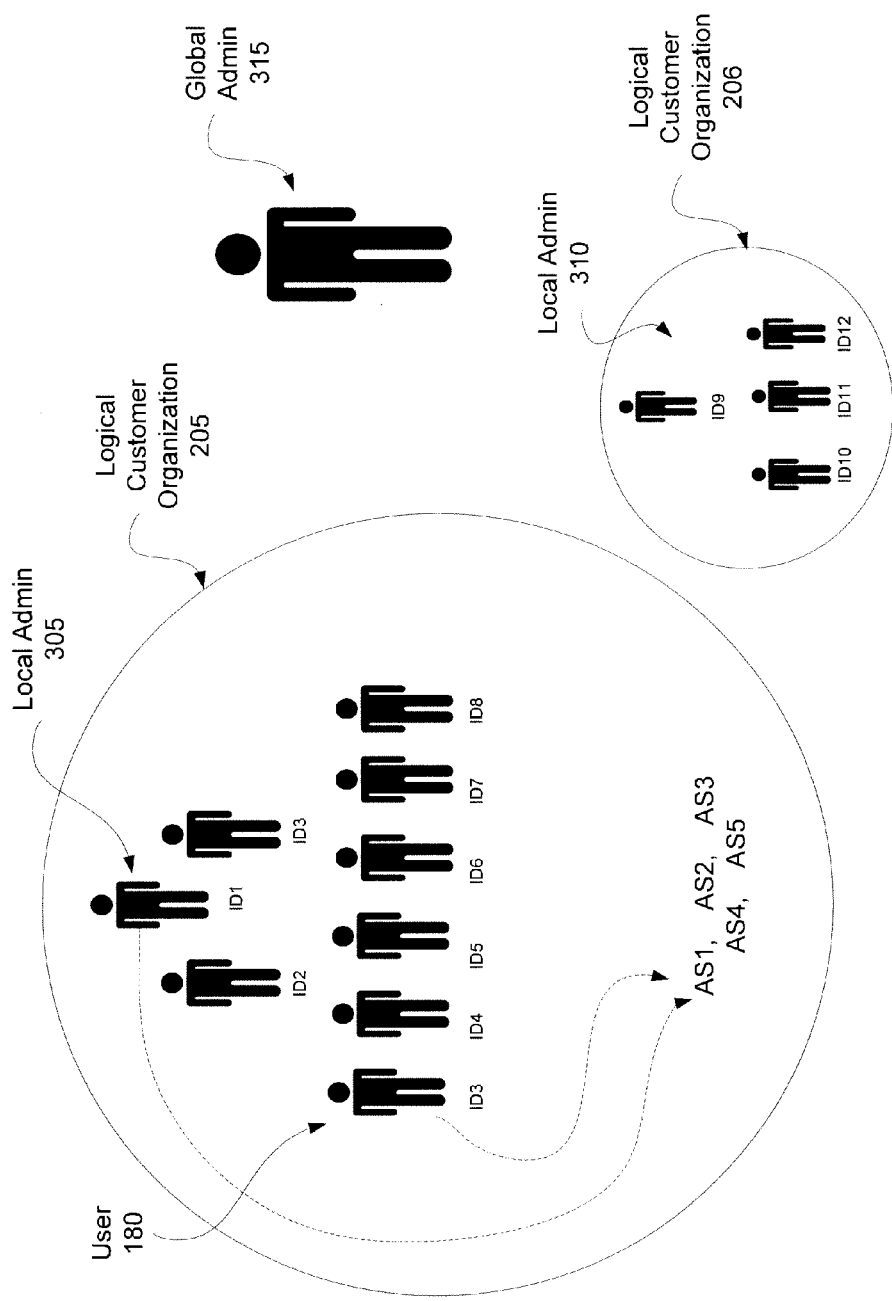
FIG. 3 is a block diagram that illustrates an example embodiment of local and global administrators.

FIG. 3 is a block diagram that illustrates an example embodiment of local and global administrators. For some embodiments, a group of users can be assigned to a logical customer organization. Management responsibilities of the local and global administrators are applied based on business rules and based on a hierarchical model, and are determined by the customers.

All the users in a logical customer organization may have visibility to all the assets associated with that logical customer organization. For example, all the users assigned to the logical customer organization 205 may have visibility to the assets AS1-AS5. Similarly, all the users assigned to the logical customer organization 206 may have visibility to the assets AS6-AS10.

A user associated with one logical customer organization is not allowed to access or have visibility to assets associated with another logical customer organization. For example, when the user 180 logs in to the portal, the user 180 is not able to access the assets AS6-AS10 because these assets are associated with the logical customer organization 206 and not the logical customer organization 205. However, if it is necessary for the user 180 to access the assets in the logical customer organization 206, a different login ID may be assigned to the user 180. This allows access security to be managed within each logical customer organization.

One or more of the users assigned to a logical customer organization is designated as an administrator. For some embodiments, the administrator is a user who has at least the ability to manage user permission on asset for any asset within a user group. The concept of user group is described below. The administrator is capable of assigning permissions, approving, searching and modifying users within the user group. For some embodiments, an administrator may be a local administrator, a global administrator or a super administrator (as described below). A local administrator is able to manage one or more assets associated with the logical customer organization. For example, the local administrator 305 manages one or more assets within the logical customer organization 205, and the local administrator 310 manages one or more assets within the logical customer organization 206.

A local administrator has the ability to grant asset permissions to one or more users associated with the same logical customer organization. The local administrator may add a new user, delete a user, or modify their permissions to an asset. For example, a user with the login ID10 may send a request to the local administrator 305 to be added to a list of user who has access to the asset AS1. At a subsequent time, the same user may be removed by the local administrator 305 from having access to the asset AS1. This granting and removing permission to the asset AS1 does not affect the user profile of the user with the login ID10. For some embodiments, the local administrator is not allowed to modify the profiles of the users. There may be one or more local administrators, each responsible for managing one or more assets. There may be a "group administrator" who is able to manage all of the assets assigned to two or more other local administrators. This provides some levels of flexibility as the group administrator may fill in for the local administrator whenever necessary. The local administrators are determined by the customer.

As illustrated by the dotted line in FIG. 3, the local administrator 305 may be responsible for managing only the asset AS1. A different local administrator may be responsible for managing assets other than the AS1. The dotted line from the user 180 to the asset AS1 is used to represent that the user 180 is given access to the asset AS1 by the local administrator 305. Note that the local administrator 305 can give users permission only to the asset AS1. The local administrator 305 cannot administer or give permissions to the other assets AS2-AS5.

Global Administrators

For some embodiments, there may be one or more global administrators. A global administrator may have visibility to all of the assets associated with one logical customer organizations. For example, global administrator 315 has visibility to the assets AS1-AS5 in the logical customer organization 205 or the assets AS6-AS10 in the local customer organization 206. However, the global administrator 315 may use one user ID to manage the assets A1-A5 in the logical customer organization 205 and a different user ID to manage the assets A6-A10 in the logical customer organization 206. For some embodiments, a global administrator cannot use the same user ID to manage assets in different logical customer organizations. The global administrators are determined by the customer.

Super Administrator

In addition to the local administrators and global administrators, there may be a super administrator. A super administrator may have all the authority that the local and global administrators have. That means the super administrator may grant permissions to any asset to any users. The super administrator may also have the authority to manage users, user groups, etc. The roles of the super administrator, the global administrators and the local administrators may be performed by different people. Alternatively, some roles may be performed by the same person, depending on the configuration. The super administrator is determined by the customer. The super administrator may have the authority to make a user a global administrator or a local administrator. Thus, a user who wants to have access to an asset may make a request to a local administrator, a global administrator or a super administrator.

Asset Tree and Asset-Based Permission Models

Figure 4A:
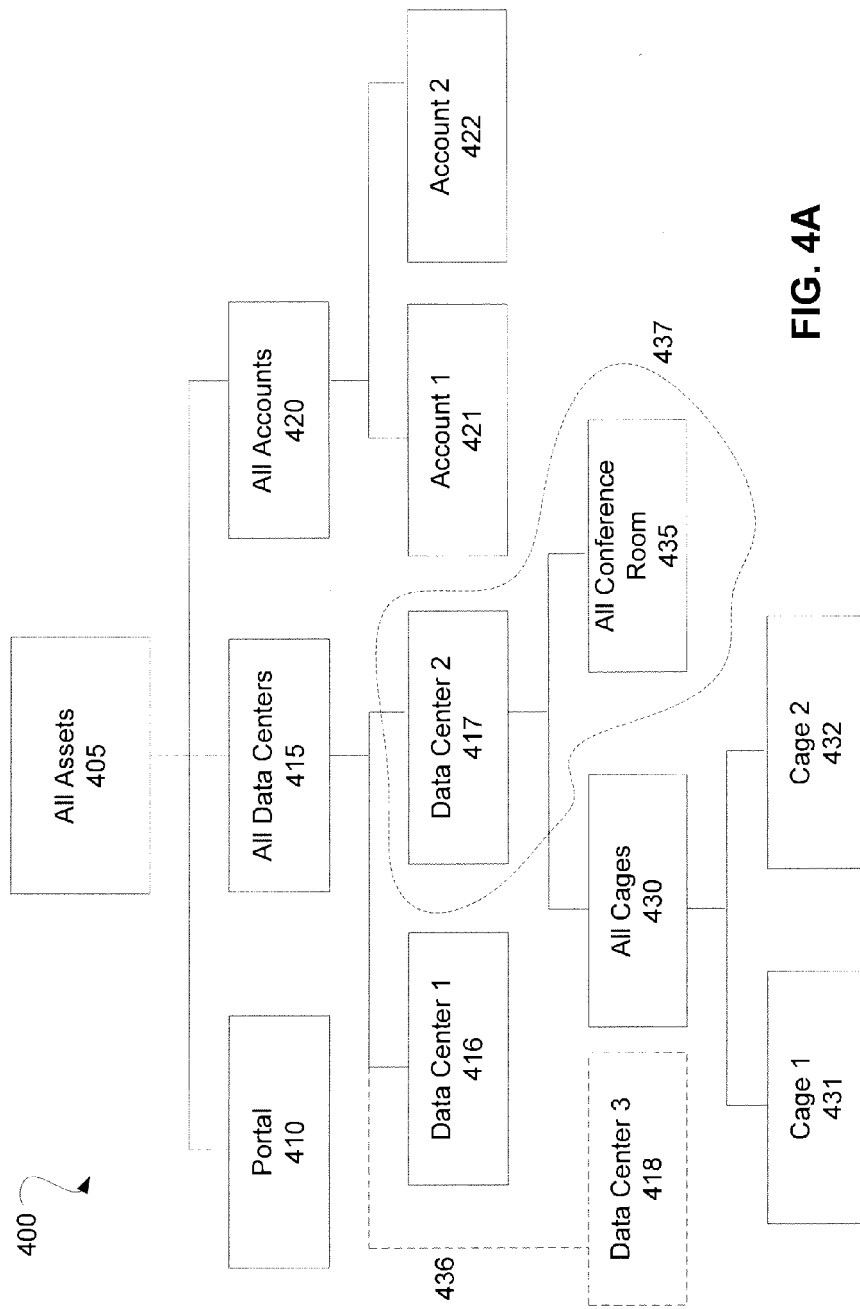
FIG. 4A is a block diagram that illustrates an example embodiment of an asset tree.

FIG. 4A is a block diagram that illustrates an example embodiment of an asset tree. Asset tree 400 illustrates physical assets and logical assets. In this example, the assets are arranged in a hierarchical model or tree structure. At the top or root of the asset tree 400 is all assets block 405. At the next lower level are the asset types, and they include portal block 410, all data centers block 415, and all accounts block 420. The all accounts block 420 may be used to access user account information. The all accounts block 420 may be accessed by a super administrator to manage the users and their profiles. For some embodiments, the accounts block 420 may not be accessed by the users, the local administrators and the global administrators. As mentioned above, the super administrator may have all the authorities and capabilities of the local administrators and global administrators.

The portal block 410 may be used to access logical assets. The all data centers block 415 may be used to access physical assets. This includes assets associated with first data center block 416 and second data center block 417. For example, accessing a physical asset may include physically being at a data center. An employee or someone acts on the behalf of the service provider may need to verify to determine if a user has the permission to access the physical asset. This verification may include using a secured portal to determine the permission granted to that user and whether to allow entry into the data center.

When a new data center block 418 is added (illustrated with dotted lines 436), the new data center block 418 is placed at the same level as the first data center block 416 and the second data center block 417. At a next lower level from the all accounts block 420 are a first account block 421 and a second account block 422. At a next lower level from the second data center block 417 are the cages block 430 and the all conference room block 435. Below the cages block 430 are the first cage block 431 and the second cage block 432.

When a new asset is added to the asset tree 400, it is added based on whether it is a physical asset, or a logical asset. The new asset is also added in the appropriate branch of the asset tree 400 depending on the relationship of the new asset to the existing assets. An existing asset may also be removed from the asset tree 400. For some embodiments, when an existing asset is removed, all of the assets linked to and positioned at lower levels than the asset to be removed will also be removed. For example, removal of the cages block 430 will also remove the first cage block 431 and the second cage block 432 from the asset tree 400.

As described above, an asset may be managed by a local administrator. Generally, when the local administrator is assigned an asset at a parent level, the local administrator may also be responsible for managing all of the assets at the corresponding children levels directly linked to and positioned at lower levels from the parent level. In some situations, a local administrator may be assigned an asset at a child level such as, for example, the data center 1 illustrated in block 416.

For some embodiments, when a user is given access to an asset positioned at a particular level of the asset tree, the user may also be given access to all of the assets at the associated children levels.

For some embodiments, the permissions given to a user may be limited instead of being extended to all the assets at the children levels. For example, a user may be given permissions to access the data center 2 illustrated in block 417, but that permission is limited to the conference room illustrated in block 435, and does not include the cages illustrated in block 430. This is referred to access-pruning and is illustrated by the dotted lines 437 in FIG. 4A.

User Group and Asset Group Models

Figure 4C:
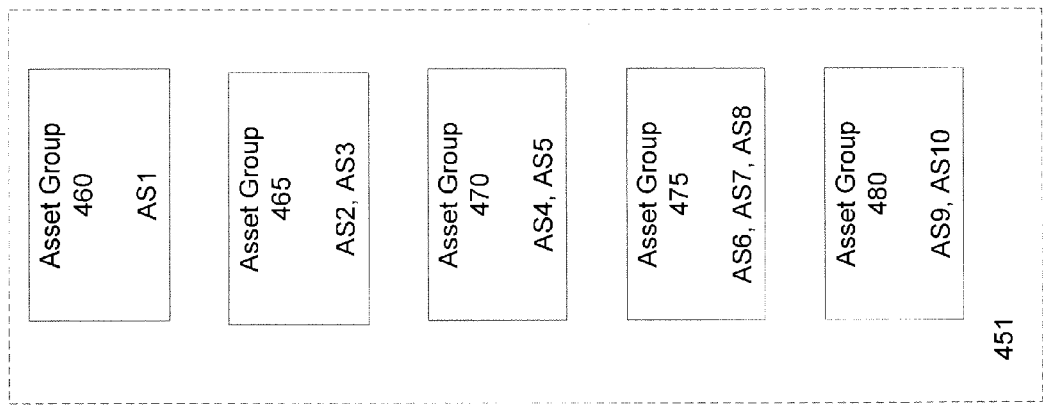
FIG. 4C is a block diagram that illustrates an example embodiment of asset groups.
Figure 4B:
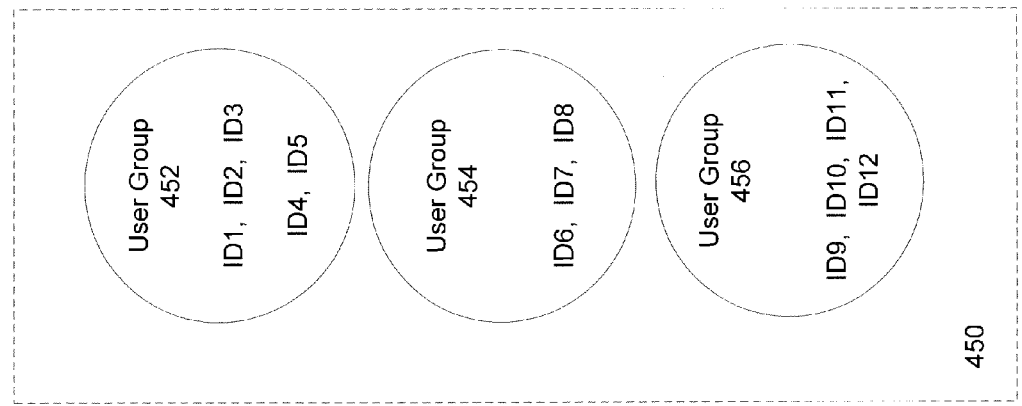
FIG. 4B is a block diagram that illustrates an example embodiment of user groups.

FIG. 4B is a block diagram that illustrates an example embodiment of user groups. Users may be grouped into user groups. One or more user groups may be associated with a logical customer organization. As illustrated in FIG. 4B, the users having login ID1-1D12 are grouped into three different user groups 452-456. These three user groups may comprise all of the users that manage assets on behalf of customer 450. These users may be allowed to use the portal provided by the service provider to access the assets according to the agreements established between the customer 450 and the service provider.

In the current example, a first user group 452 includes users assigned the login ID1-1D5. The second user group 454 includes users assigned the login ID6-1D8. The third user group 456 includes users assigned the login ID9-1D12. The users may be determined by the customer 450. The service provider may enable the user to register and select own login ID via the portal. Alternatively, the service provider may automatically generate the login ID on behalf of the user during a registration process. Association of a login ID to a user group and to a logical customer organization may be performed by the super administrator.

FIG. 4C is a block diagram that illustrates an example embodiment of asset groups. Assets made available to the customer 450 by the service provider may be grouped into asset groups. One or more asset groups may be assigned to and managed by a local administrator. As illustrated in FIG. 4C, the assets AS1-AS10 are grouped into five different asset groups 460-480. These five asset groups may be associated with a service provider 451 and made available to the customer 450 according to the agreements established between the customer 450 and the service provider 451. As may be noted, an asset group may comprise one or more assets.

A local administrator may grant users permission to access the assets. This may be done by associating permission right to a login ID. The permission may be granted based on asset group. When an asset group is comprised of multiple assets, the permission granted to an asset group may comprise permission granted to all of the individual assets in the asset group.

For some embodiments, the concept of asset tree, user group and asset group may be extended to have multiple asset trees, user groups and asset groups. Many-to-many relationships between the user groups and the asset groups may be established. Management of user groups and asset groups may be performed separately. This provides flexibilities in forming the user groups and asset groups based on different criteria. For example, the user groups may be formed based on functions performed by the users. There may include finance user group, and there may be a finance asset group, and so on. A user in the finance group may not have visibility to assets that belong in the shipping asset group, and so on.

Database Tables

FIG. 5 is a block diagram that illustrates an example embodiment of the database tables. The tables illustrated here are representative examples of some of the tables that may be used to implement embodiments of the invention. These tables include asset table 510, user group table 515, asset group table 520, user table 525, user asset permission table 530, permission table 535, and customer organization table 540. Key fields in each table may be defined. Relationship among the tables may also be defined.

The customer organization table 540 may be used to describe the logical customer organizations 205 and 206 illustrated in FIG. 2. The agreement table 545 may be used to describe the agreements between the customer and the service provider. For example, the agreement table 545 may describe the agreements 210-214 illustrated in FIG. 2. There may be relationship information between the customer organization table 540 and the agreement table 545 to associate a logical customer organization with one or more agreements.

The user table 525 may be used to describe the users that may use the portal of the service provider to access the assets. For example, the users may include those that have the login ID1-1D12 illustrated in FIG. 4B. The user group table 515 may be used to describe groups that the users belong to such as, for example, the user groups 452-456 illustrated in FIG. 4B. There may be tools that allow setting up a new user profile, maintaining the user profile and removing the user profile to reflect a life cycle of a user. The tools may also allow associating a user with a user group, a logical customer organization, and so on.

The asset table 510 may be used to describe the assets provided by a service provider according to agreements between the service provider and the customer. For example, the assets may include AS1-AS10 illustrated in FIG. 4C. The asset group table 520 may be used to describe groups that the assets belong to such as, for example, the asset groups 460-480 illustrated in FIG. 4C.

The permission table 535 may be used to describe different types of permissions that may be granted to the users. The user asset permission table 530 may be used to describe the permissions granted to a particular user to access a particular asset. Although not described, other tables may also be defined in the database and used to implement embodiments of the invention.

For some embodiments, using the models described above, a user assigned to a user group and associated with a logical customer organization may use a unified user login ID to access all the assets in the asset group associated with the same logical customer organization, assuming appropriate permissions have been granted. This is different from the traditional approach where a different login ID is needed to access each of the assets. When the same user has a need to access an asset in an asset group associated with a different logical customer organization, a different login ID may be necessary.

Architecture

Figure 6B:
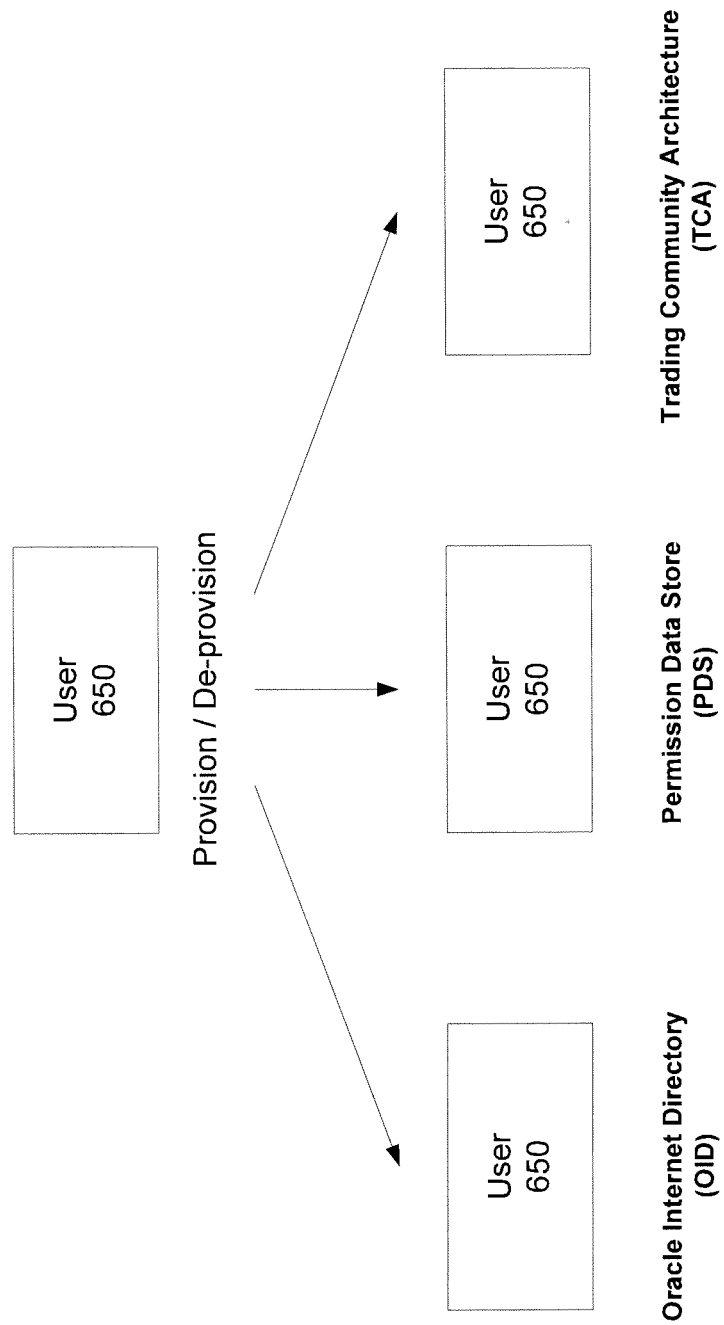
FIG. 6B is a block diagram that illustrates an example embodiment of an architecture for user management that may be used.

FIG. 6A is a block diagrams that illustrates an example embodiment of an architecture that may be used together with a portal. For some embodiments, embodiments of the present invention may be implemented using Oracle Identity Manager (OIM) as a central provisioning tool to provision and de-provision users, including their profile information into Oracle Internet Directory (OID), Trading Community Architecture (TCA). As described above, OIM, OID and TCA are products of Oracle Corporation. For some embodiments, information relating to the provisioning and de-provisioning of the user and their profiles is also provided to a Permission Data Store (PDS). FIG. 6B is a block diagram that illustrates an example embodiment of architecture for user management that may be used. The provisioning and de-provisioning of a user is illustrated.

The PDS 615 is configured to be flexible and scalable to support customer specific model to fit their business needs.

It supports hierarchical asset management, user, and asset groups. The PDS 615 is configured to keep track of permissions granted to users who have been approved. The OIM, OID, TCA and PDS work together to enable the implementation of the users, the assets, and the permissions so that the embodiments of the invention can operate in a secured manner.

Figure 6C:
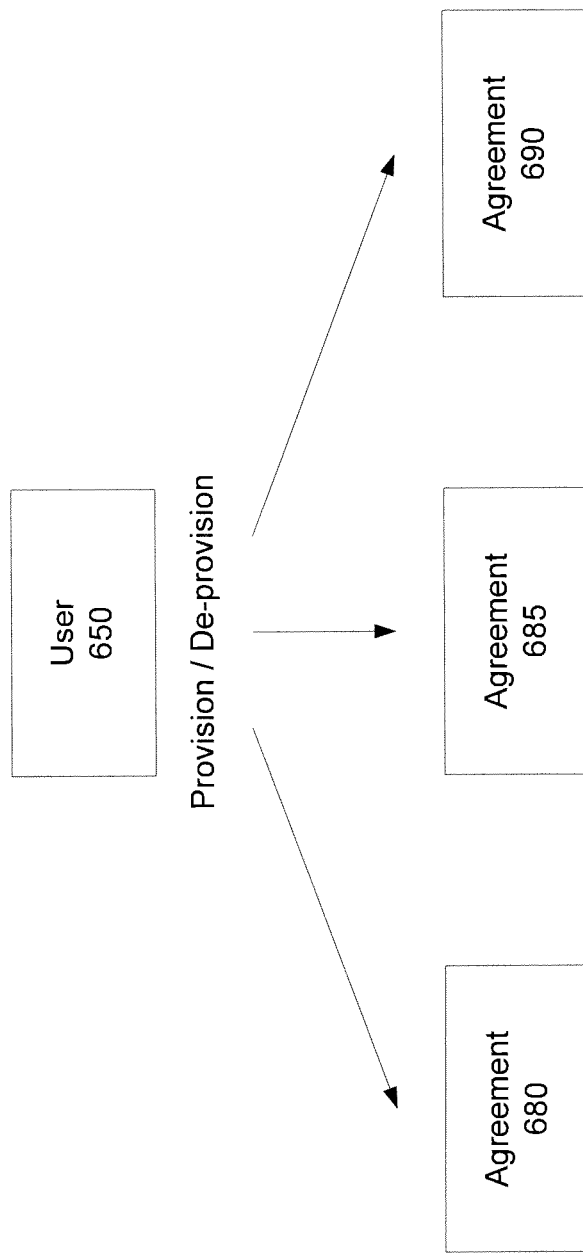
FIG. 6C is a block diagram that illustrates an example embodiment of association between users and agreements.

FIG. 6C is a block diagram that illustrates an example embodiment of association between users and agreements. When a user logs in, the PDS 615 is consulted to make sure that the login ID and the passwords are what they are supposed to be. Once the user is verified as an approved user, the association of the user and one or more agreements is verified, as illustrated in FIG. 6C with agreements 680-690. This information may be stored in the tables of the relational database. For example, the tables may include user table 525, agreement table 545 and customer organization table 540. The information may be retrieved using the TCA. The TCA and the PDS may be synchronized with one another to establish information relating to the users and the association of the users with the assets based on the permissions.

A user can login using the portal applications 605 provided by the service provider. There may be different portal applications. For example, the service provider may provide a customer portal, a marketplace portal, or a service directory portal. These portals may use the same relational database to authenticate users, determine their permissions, and retrieve or generate information based on their permissions. Each of the logged in user may have a different user experience with the portal based on their permissions as conveyed by the PDS 615 to the portal applications 605. For example, the portal applications 605 may present a first user with the login ID1 a user interface that only shows the assets AS1 and AS2. A second user with the login ID2 may see a user interface that does not show the assets AS1 and AS2 because the second user does not have access to the assets AS1 and AS2.

It may be noted that the portal of the service provider may be used by users that are associated with different customers. Each customer may be associated with one or more logical customer organization. The logical customer organization that the user is associated with and the user login ID may be stored in the user table 525 illustrated in FIG. 5. As described above, the users are determined by the customer. The user's login ID may be established by working with the service provider. Some of these users may be designated as the local administrators and global administrators. The non-administrator or normal users may be granted permissions to access assets by the local and/or global administrators. When a user logs in to the portal, the user's login ID is verified to determine if the user is an approved user. Being approved may mean that the user has been granted permissions by the appropriate local and/or global administrators.

If it is determined that the user is an approved user, the PDS 615 is searched to determine the permissions granted to the user. However, if it is determined that the user is not an approved user, the user may be taken through an approval process. This may be done by determining the logical customer organization that the user should be associated with, searching the OIM and locating a local or global administrator who has the authority to grant the user necessary permissions, etc. The local or global administrator may then use the portal to grant the permissions to the user.

The diagram 600 also includes service layer 610 positioned between the portal applications 605 and the data collection/synchronization framework 620. The service layer 610 is configured to interact with disparate backend systems to fetch, transform, and reconcile data in appropriate format into the PDS 615.

The service layer 610 is configured to enable loose coupling between the portal applications 605 and the PDS 615. The service layer 610 masks the complexity of the PDS 615 to the calling portal applications 605 by providing simple to use interfaces. For example, the service layer 610 exchanges information between the PDS 615 and the portal applications 605, where the information may include asset tree related information and user interface (e.g., screens, web pages, etc.) information.

The PDS 615 in the middle layer is positioned between the service layer 610 and the data collection/synchronization framework 620. The PDS 615 is configured to receive requests from the portal applications 605, retrieve information from the data collection/synchronization framework 620, and provide responses to the portal applications 605. The retrieved information may include information stored in one or more of the database tables illustrated in FIG. 5. The PDS 615 is further configured to link the agreement information together with user information, asset information and permission information based on their relationships and put them into relevant data structures. For example, the linked information may be stored in the user asset permission table 530 illustrated in FIG. 5. The PDS 615 organizes all the information that it retrieves from the database and presents it to the portal applications to provide a customized portal interface to the user. As described above, a user or portal interface of a first user may differ from a portal interface of a second user because each may be associated with a different logical customer organization, has different asset permissions, etc. It may be noted a portal interface of a non-administrator user may differ from a portal interface of a local or global administrator.

The PDS 615 also interacts with the portal applications 605 via the service layer 610. This enables the PDS 615 to gather information about the login ID of the user and map the login ID with the appropriate permissions, assets, and agreement information that the PDS 615 retrieves via the data collection/synchronization framework 620. The operation of the PDS 615 enables the relevant data to be logically managed to support having unified user logins and asset-based permission techniques in accordance with some example embodiments of the present invention. Also illustrated in FIG. 6A are the different Oracle products that are used by the data collection/synchronization framework 620. These include the OIM 625, the Oracle Enterprise Resource Planning (ERP) 630, and the Oracle Operational Data Store (ODS) 635. Features and functionalities of the Oracle products can be found at the web site of Oracle Corporation.

Figure 7A:
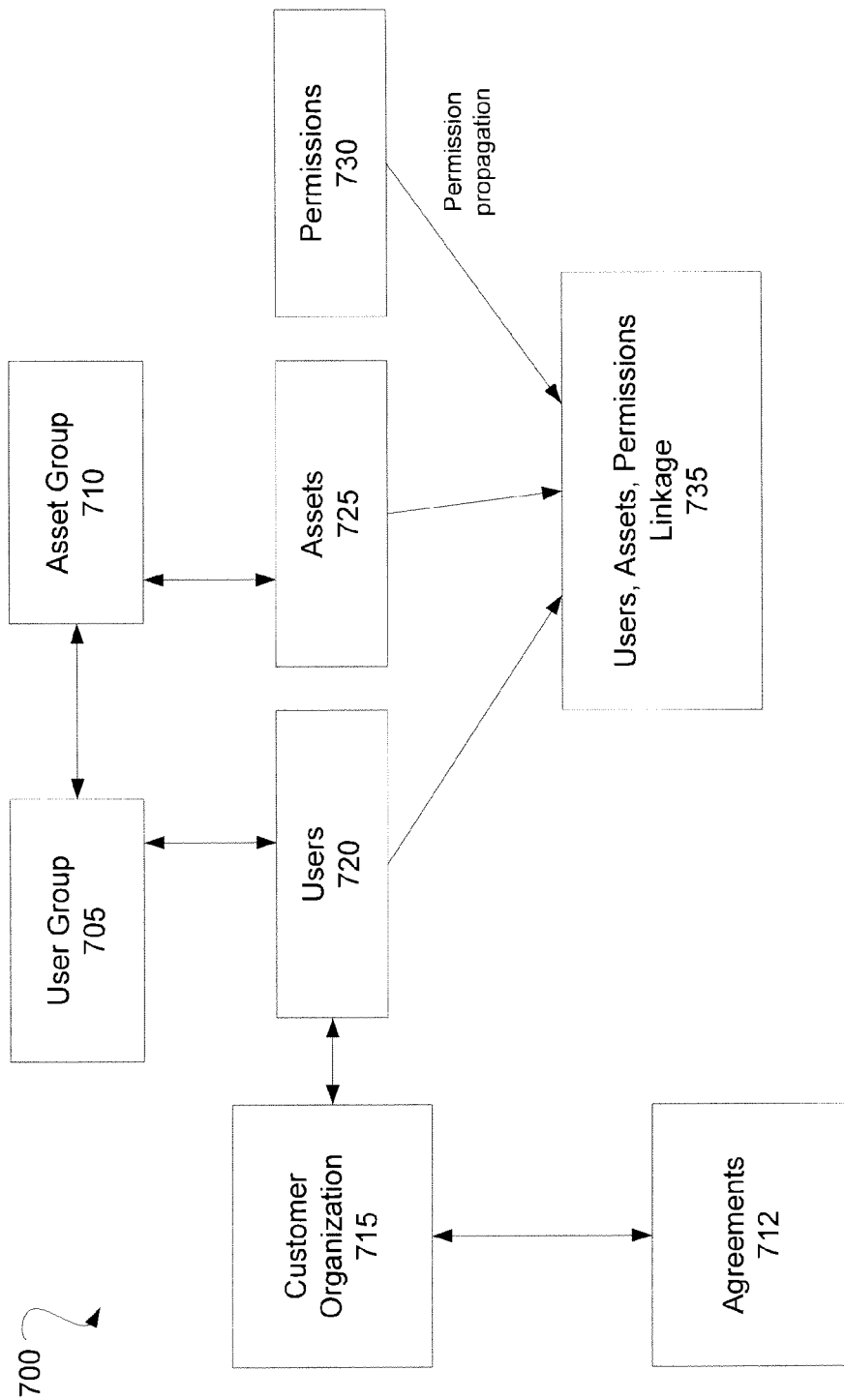
FIG. 7A is a block diagram that illustrates an example embodiment of information processed by the permission data store (PDS)

FIG. 7A is a block diagram that illustrates an example embodiment of information processed by the permission data store (PDS). Diagram 700 illustrates that a logical customer organization information 715 can contain or be linked to multiple service contracts or agreements 712. A user 702 can be associated with one logical customer organization 715. The user 702 can belong to a user group 705. The assets 725 can belong to the asset group 710. The users, assets, and permission can be linked and represented together, as shown in block 735. Permission is given to a user when a user is linked with the asset.

Figure 7B:
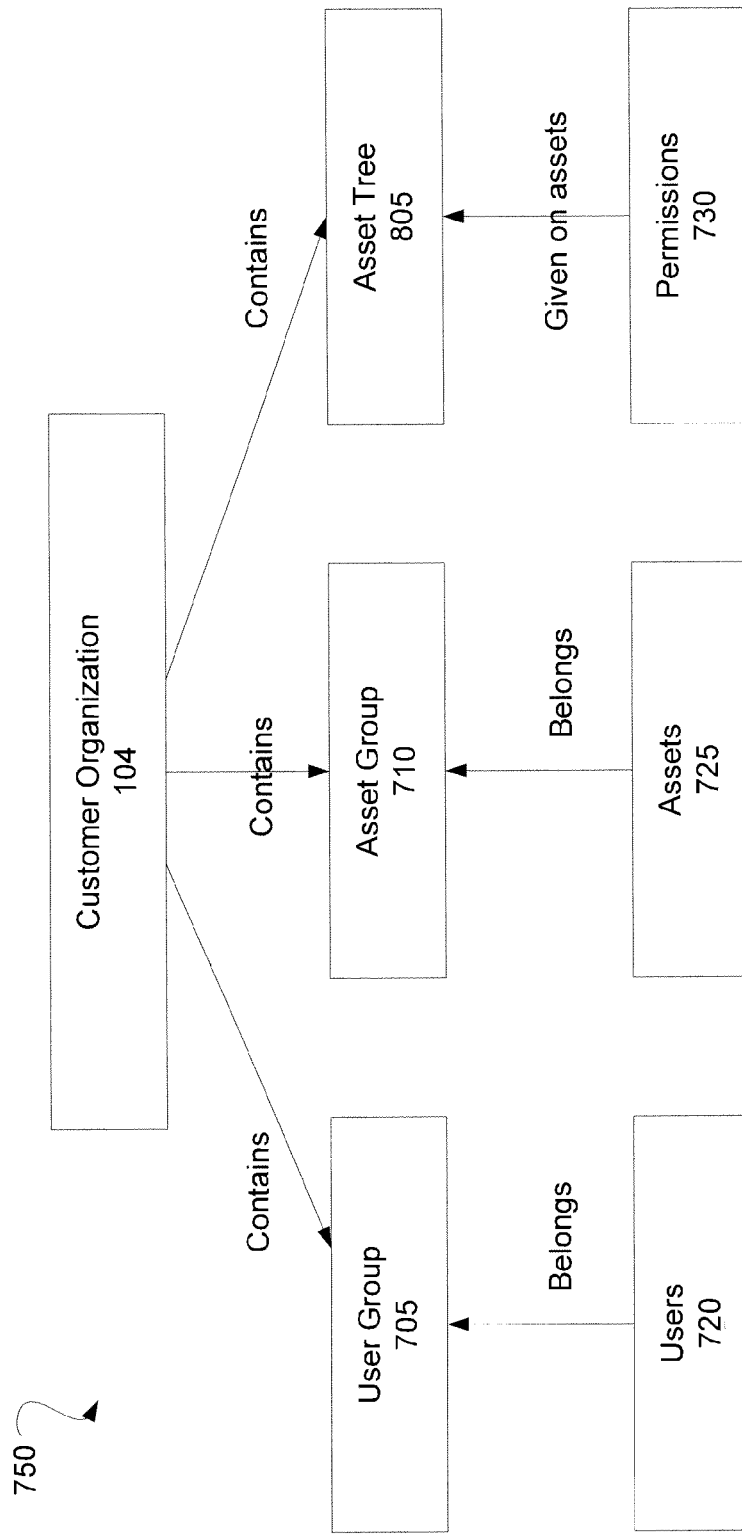
FIG. 7B is a block diagrams that illustrates an example embodiment of relationships among different information entities.

FIG. 7B is a block diagrams that illustrates an example embodiment of relationships among different information entities. Diagram 750 includes logical customer organization block 715. Associated with the logical customer organization 715 are the user group 705, the asset group 710 and the asset tree 755. As described above, the users 720 belong to the user group 705, the assets 725 belong to the asset group 710. The definition of the user groups, the asset groups, and their respective members may be provided by the customer. The permissions 730 are given on the assets included in the asset tree 755 by, for example, the local and/or global administrators.

The middle layer where the PDS 615 resides may be viewed as an abstraction layer. The PDS 615 extracts data from the various systems in the lower layer, transform them and put them into a common data model. The PDS 615 then communicates the information from the common data model to the portal applications 605. This enables the portal applications 605 to focus on presenting information to the users rather than having to deal with the complexity of the systems in the lower layer.

It should be noted that, although the above descriptions refer to local administrators, global administrators, and super administrator, the number of roles may reduced depending on the implementation. For example, instead of having a local administrator at each location or for each asset, a global administrator may manage multiple assets in multiple locations remotely. This provides the customers flexibility in determining how they want the assets to be managed. They can delegate the administration responsibility to one administrator or many administrators. They can organize the administrators and their asset management responsibilities a hierarchy of global and local administrators, etc.

Permission Propagation

For some embodiments, permissions associated with an asset and a logical customer organization may be propagated to PDS 615 in the middle layer. For example, when a local administrator grants a user with the login ID1 permissions to use the asset AS3 located in a first region, that permission information is propagated to the PDS 615. Similarly, when another local administrator grants a user with the login ID8 permissions to use the asset AS5 located in a second region, that permission information is also propagated to the PDS 615. Thus, the PDS 615 may be viewed as a master permission data source where permissions to all the assets are merged together. The permission propagation is illustrated in FIG. 7A.

Network Environment

Figure 8A:
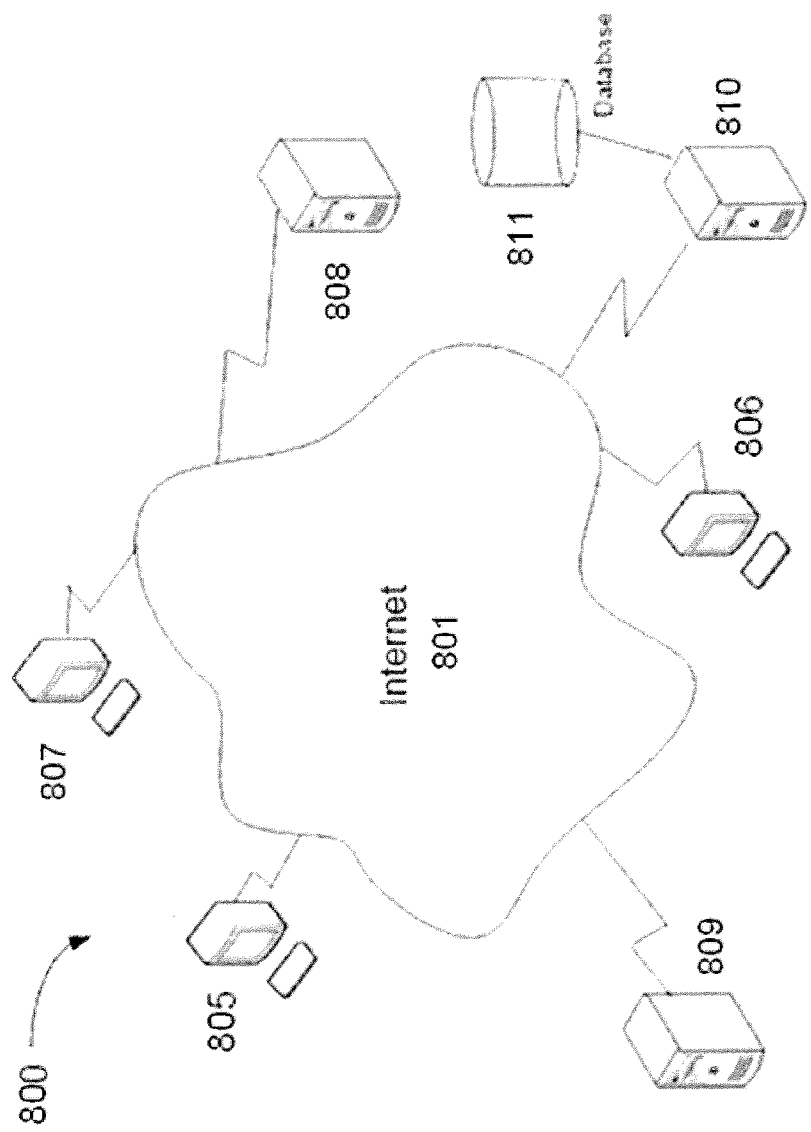
FIG. 8A is a network diagram illustrating an example embodiment of a network environment that may be used.

FIG. 8A is a network diagram illustrating an example embodiment of a network environment that may be used. Network environment 800 has a network 801 that connects with server computers 808 through 810 and client computers 805 through 807. Network environment 800 may also be referred to as a client-server environment. As illustrated, several server computers 808 to 810 and several client computers 805 to 807 are connected to and communicate with one another via the network 801, which may be, for example, an on-chip communication network. Note that alternatively the network 880 might be or include one or more of: inter-chip communications, an optical network, the Internet, a Local Area Network (LAN), Wide Area Network (WAN), satellite link, fiber network, cable network, or a combination of these and/or others. Note that the number of client computers and server computers illustrated in FIG. 8A are used as examples only and is not meant to be restrictive.

The server computers 808 to 810 may represent, for example: a master device on a chip; a server system; an intellectual property core, such as a microprocessor, communications interface, etc.; a disk storage system; and/or computing resources. Likewise, the client computers 805 to 807 may have computing, storage, and viewing capabilities.

The method and apparatus described herein may be applied to essentially any type of communicating means or device whether local or remote, such as a LAN, a WAN, a system bus, on-chip bus, etc.

It is to be further appreciated that the use of the term client computer and server computer is for clarity in specifying who initiates a communication (the client) and who responds (the server). No hierarchy is implied unless explicitly stated. Both functions may be in a single communicating device, in which case the client-server and server-client relationship may be viewed as peer-to-peer. Thus, if two devices such as the client computer 805 and the server computer 808 can both initiate and respond to communications, their communication may be viewed as peer-to-peer. Likewise, communications between the server computers 808 and 809 and client computers 805 and 806 may be viewed as peer to peer if each such communicating device is capable of initiation and response to communication.

FIG. 8A also illustrates an embodiment of a server computer to display the application on a portion of a media space, such as a web page, a profile page on a portal such as that provided by a service provider, etc. The application may be embedded into a third party's media space, such as an HTML web page, a page of a portal, etc. The application when executed on a server 809 causes the server 809 to display windows and user interface screens on a portion of a media space such as a web page. A user from a client computer 805 may interact with the page that contains the embedded application, and then supply input to the query/fields and/or service presented by a user interface of the application. The web page may be served by a web server 808 on any HTML or wireless access protocol (WAP) enabled client computer 805 or any equivalent thereof such as a mobile device or personal computer. The client computer 805 may include browser software (e.g., Firefox) to access the web-based anticipatory design tools hosted by one or more of the server computers 808 to 810.

For some example embodiments, the portal applications 605 may include codes scripted to execute on the server computer 810 to allow interaction with a user and to present customized interface to a user. The PDS 615 may include codes scripted to execute on the server computer 810 to cause information stored in the database 811 to be retrieved. The codes of the PDS 615 may also be configured to receive information from the portal applications 605 and to present information to the portal applications 605. The portal applications 605 may be implemented as web applications hosted on the server computer 809 and served to the browser of client computers 805 and 807. The portal applications 605 may then serve web pages that allow a user to use the client computer 805 to access the various assets associated with a particular logical customer organization. The relational database 811 may be associated with a database server such as, for example, the server computer 810. The relational database 811 may store information as defined by the database tables illustrated in FIG. 5.

Computing Environment

Figure 8B:
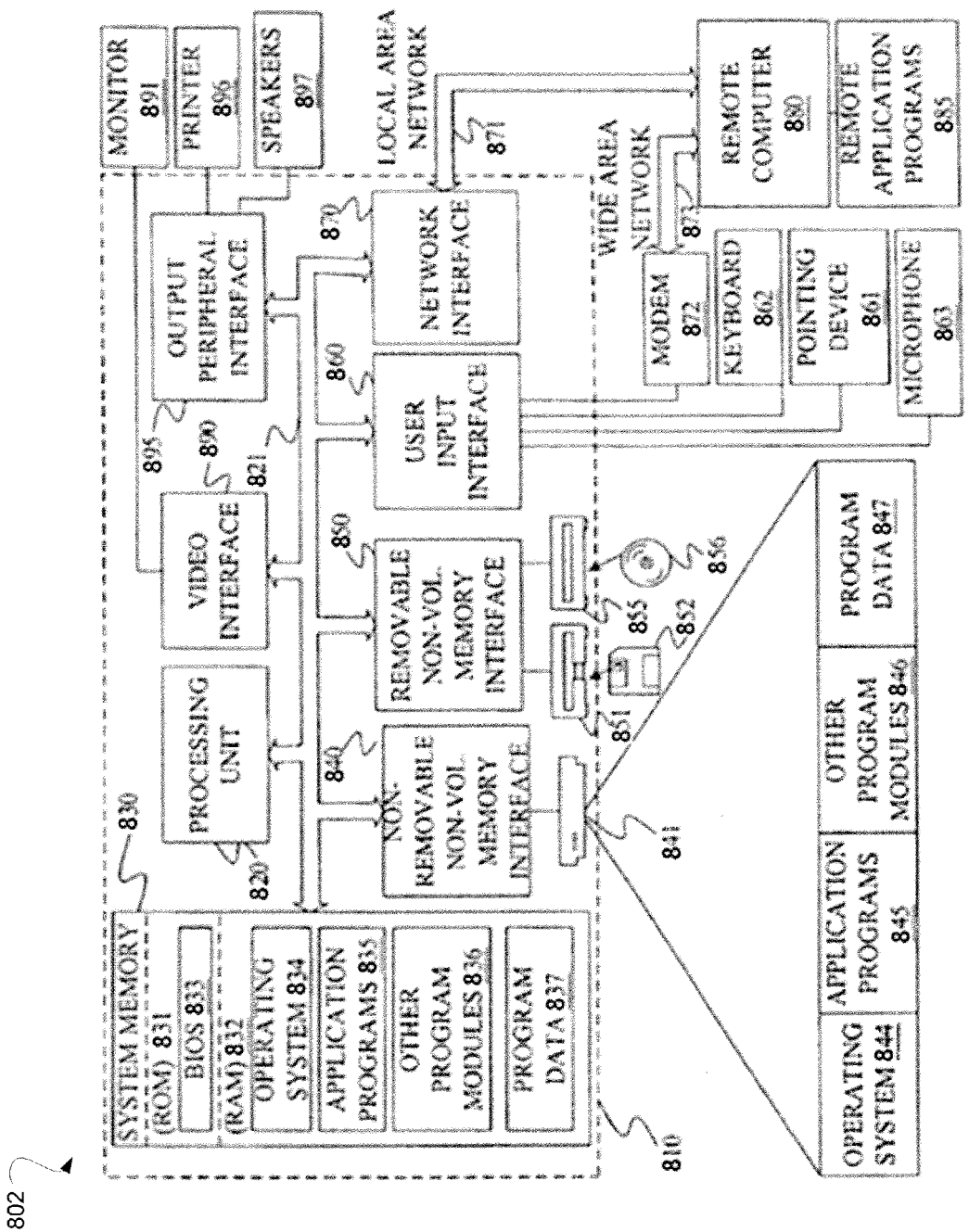
FIG. 8B is a computing environment example embodiment that may be used.

FIG. 8B is an example computing environment that may be used with some embodiments of the invention. Computing environment 802 is only one example of a suitable computing environment and is not intended to suggest any limitations as to the scope of use or functionality of the embodiments of the present invention. Neither should the computing environment 802 be interpreted as having any dependency or requirement relating to any one or combination of components illustrated in FIG. 8B.

Embodiments of the invention may be operational with general purpose or special purpose computer systems or configurations. Examples of well known computer systems that may be used include, but are not limited to, personal computers, server computers, hand-held or laptop devices, Tablets, Smart phones, Netbooks, multiprocessor systems, microprocessor-based systems, set top boxes, programmable consumer electronics, network PCs, minicomputers, mainframe computers, distributed computing environments that include any of the above systems or devices, and the like.

Embodiments of the present invention may be described in the general context of computer-executable instructions, such as program modules, being executed by a computer system. Generally, program modules include routines, programs, databases, objects, components, data structures, etc. that performs particular tasks or implement particular abstract data types. Those skilled in the art can implement the description and/or figures herein as computer-executable instructions, which can be embodied on any form of computer readable media discussed below.

Embodiments of the present invention may also be practiced in distributed computing environments where tasks are performed by remote processing devices that are linked through a communications network. In a distributed computing environment, program modules may be located in both local and remote computer storage media including memory storage devices.

Referring to FIG. 8B, the computing environment 802 includes a general-purpose computer system 810. Components of the computer system 810 may include, but are not limited to, a processing unit 820 having one or more processing cores, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

Computer system 810 typically includes a variety of computer readable media. Computer readable media can be any available media that can be accessed by computer system 810 and includes both volatile and nonvolatile media, removable and non-removable media. By way of example, and not limitation, computer readable mediums uses include storage of information such as computer readable instructions, data structures, program modules or other data. Computer storage mediums include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer system 810. Communication media typically embodies computer readable instructions, data structures, program modules or other transport mechanism and includes any information delivery media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer system 810, such as during start-up, is typically stored in ROM 831. RAM 832 typically contains data and/or program modules that are immediately accessible to and/or presently being operated on by processing unit 820. By way of example, and not limitation, FIG. 8B illustrates operating system 834, application programs 835, other program modules 836, and program data 837.

The computer system 810 may also include other removable/non-removable volatile/nonvolatile computer storage media. By way of example only, FIG. 8B illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8B, provide storage of computer readable instructions, data structures, program modules and other data for the computer system 810. In FIG. 8B, for example, hard disk drive 841 is illustrated as storing operating system 844, application programs 845, other program modules 846, and program data 847. Note that these components can either be the same as or different from operating system 834, application programs 835, other program modules 836, and program data 837. The operating system 844, the application programs 845, the other program modules 846, and the program data 847 are given different numeric identification here to illustrate that, at a minimum, they are different copies.

A participant may enter commands and information into the computer system 810 through input devices such as a keyboard 862, a microphone 863, and a pointing device 861, such as a mouse, trackball or touch pad. Other input devices (not shown) may include a joystick, game pad, scanner, or the like. These and other input devices are often connected to the processing unit 820 through a user input interface 860 that is coupled to the system bus 821, but may be connected by other interface and bus structures, such as a parallel port, game port or a universal serial bus (USB). A monitor 891 or other type of display device is also connected to the system bus 121 via an interface, such as a video interface 890. In addition to the monitor, computers may also include other peripheral output devices such as speakers 897 and printer 896, which may be connected through an output peripheral interface 890.

The computer system 810 may operate in a networked environment using logical connections to one or more remote computers, such as a remote computer 880. The remote computer 880 may be a personal computer, a handheld device, a server, a router, a network PC, a peer device or other common network node, and typically includes many or all of the elements described above relative to the computer system 810. The logical connections depicted in FIG. 8B include a local area network (LAN) 871 and a wide area network (WAN) 873, but may also include other networks. Such networking environments are commonplace in offices, enterprise-wide computer networks, intranets and the Internet.

When used in a LAN networking environment, the computer system 810 is connected to the LAN 871 through a network interface or adapter 870. When used in a WAN networking environment, the computer system 810 typically includes a modem 872 or other means for establishing communications over the WAN 873, such as the Internet. The modem 872, which may be internal or external, may be connected to the system bus 821 via the user-input interface 860, or other appropriate mechanism. In a networked environment, program modules depicted relative to the computer system 810, or portions thereof, may be stored in a remote memory storage device. By way of example, and not limitation, FIG. 8B illustrates remote application programs 885 as residing on remote computer 880. It will be appreciated that the network connections shown are exemplary and other means of establishing a communications link between the computers may be used.

It should be noted that some embodiments of the present invention may be carried out on a computer system such as that described with respect to FIG. 8B. However, some embodiments of the present invention may be carried out on a server, a computer devoted to message handling, handheld devices, or on a distributed system in which different portions of the present design may be carried out on different parts of the distributed computing system.

Another device that may be coupled to the system bus 821 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 872 may employ a Wireless Application Protocol to establish a wireless communication channel. The communication module 872 may implement a wireless networking standard such as Institute of Electrical and Electronics Engineers (IEEE) 802.11 standard, IEEE std. 802.11-1999, published by IEEE in 1999.

Examples of mobile computing devices may be a laptop computer, a tablet computer, Netbook, cell phone, a personal digital assistant, or other similar device with on board processing power and wireless communications ability that is powered by a Direct Current (DC) power source that supplies DC voltage to the mobile device and that is solely within the mobile computing device and needs to be recharged on a periodic basis, such as a fuel cell or a battery.

Flow Diagram

Figure 9:
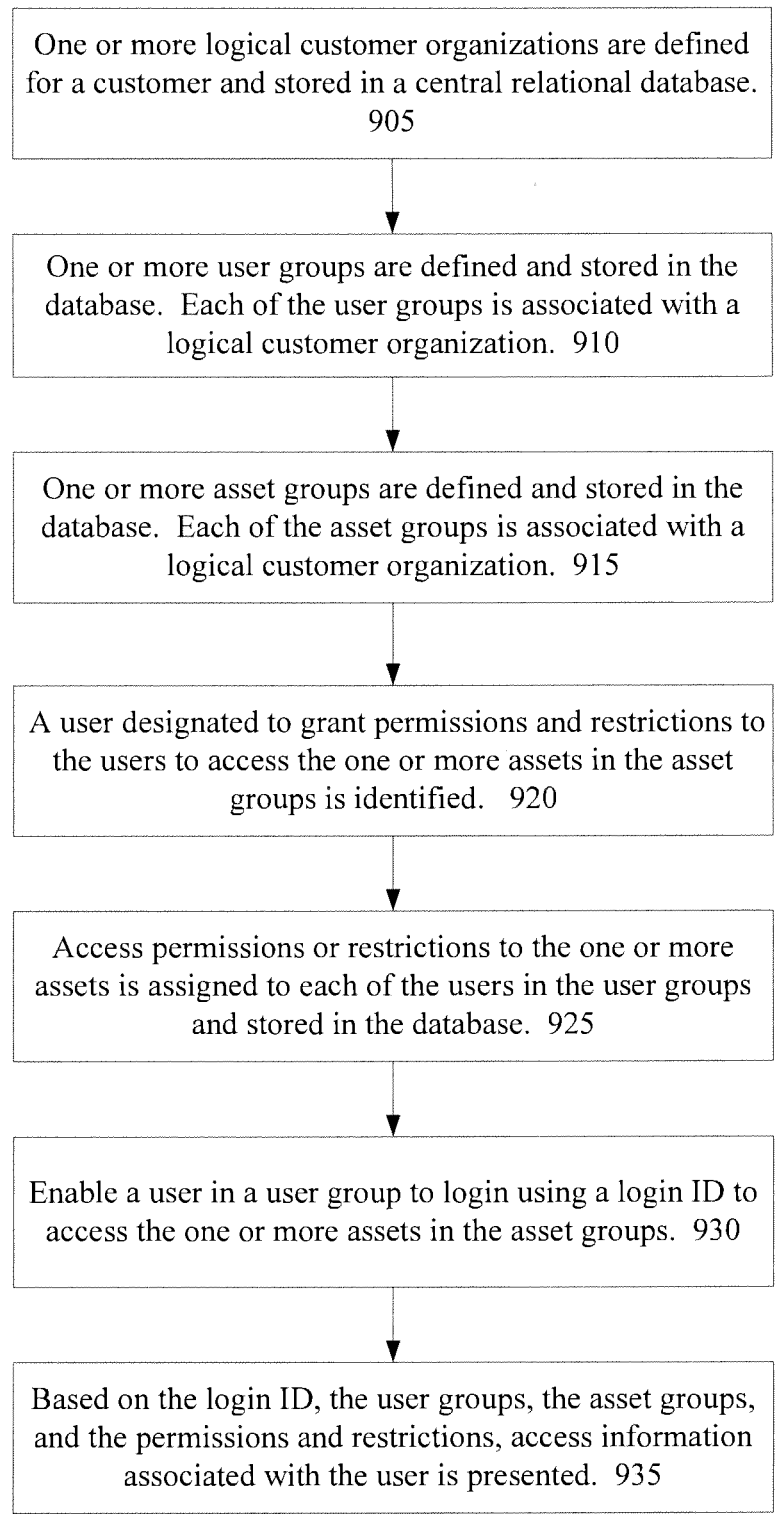
FIG. 9 is an example flow diagram that illustrates a process enabling permissions and restrictions management, in accordance with some embodiments.

FIG. 9 is an example flow diagram that illustrates a process enabling permissions and restrictions management, in accordance with some embodiments. Flow diagram 900 illustrates a process that may be performed to manage permissions and restrictions to access one or more asset in one or more co-location facilities.

In block 905, one or more logical customer organizations are defined for a customer and stored in a central relational database. Each of the logical customer organizations is associated with one or more agreements established between a customer and a service provider. In block 910, one or more user groups are defined and stored in the central relational database. Each of the user groups is associated with a logical customer organization and is comprised of one or more users. In block 915, one or more asset groups are defined and stored in the central relational database. Each of the asset groups is associated with a logical customer organization. In block 920, a user designated to grant permissions and restrictions to access the one or more assets is identified. The one or more assets include the assets in the asset groups. The permissions and restrictions are granted to the users in the user groups.

In block 925, access permissions or restrictions to the one or more assets is assigned to each of the users in the user groups. Information regarding the permissions and restrictions is stored in the central relational database. In block 930, a portal is used to enable a user to login using a login ID to access the one or more assets in the asset groups. In block 935, based on the login ID, the user groups, the asset groups, and the permissions and restrictions granted to the user, access information associated with the user is presented to the user via a user interface associated with the portal.

From the above, some embodiments of the invention include systems and methods that use a central relational database containing information associated with logical and physical assets, wherein the logical and physical assets are associated with one or more geographically distinct co-location facilities. A permissions model is configured to enable at least one user from a customer to be designated as having authority to grant or revoke permissions to the logical and physical assets, the permissions granted or revoked to other users of the same customer. An asset tree model is configured to enable grouping of the logical and physical assets in one or more asset groups and according to a hierarchical structure. A user group model is configured to enable grouping of the users of the customer in one or more user groups and according to the geographically distinct co-location facilities. The user groups and the asset groups are managed independently of one another. Many-to-many relationships are established among the users in the user groups, the assets in the asset groups, and the permissions granted to the users to use the assets.

Some embodiments of the invention include a user interface configured to display information related to assets granted to a first user according to permissions granted to the first user. The assets are provided by a service provider which is associated with the customer based on one or more agreements to enable the customer to access the logical and physical assets. The at least one user from the customer to be designated as having the authority to grant or revoke permissions to the logical and physical assets is an administrator responsible for managing logical and physical assets at an asset level. That designated user is authorized to administer over one of (1) a single asset group, (2) all of the asset groups, and (3) some subsets of all of the asset groups. The one or more asset groups are associated with one or more co-location facilities. The permissions granted to an asset at a first level of the hierarchy model includes permissions granted to other assets at levels lower than the first level in the hierarchy model. The other assets at the levels lower than the first level in the hierarchy model is limitable to less than a total number of assets included in the levels lower than the first level. The agreements are grouped into one or more agreement groups. Each agreement group is associated with a logical customer organization. Each logical customer organization is associated with an asset group and a user group. A user can be a member of at least one user group. An asset is a member of at most one asset group. When it is necessary for the user to access more than one asset in an asset group associated with same logical customer organization, the user is to use a first login identification (ID) to access a first asset and a second asset in the asset group. When it is necessary for the user to access an asset in the first asset group and an asset in a second asset group, the user is to use the first login ID to access the asset in the first asset group and a second login ID to access an asset in a second asset group. The physical and logical assets may be associated with a data center.

Some embodiments of the invention include applying a permissions model to enable at least one user from a customer to be designated as an asset administrator having authority to grant or restrict permissions to access assets in one or more geographically distinct co-location facilities. The permissions are applied to other users of the same customer. A logical customer organization model is applied to enable grouping of one or more agreements between the customer and a service provider, the agreements enabling the users of the customer to access the assets of the service provider. An asset hierarchical model is applied to enable grouping of the assets in one or more asset groups and according to the logical customer organization model. Relationships are established among the users in the user groups, the assets in the asset groups, and the permissions granted by the asset administrator to the users. The information related to the relationships is presented to the users via a user interface associated with a portal of the service provider. A first user is a member of at least one user group. An asset is a member of at least one asset group. The agreements are grouped into one or more agreement groups. Each agreement group is associated with a logical customer organization. Each logical customer organization is associated with at least one asset group and at least one user group. The first user is to use a first login identification (ID) to access a first asset and a second asset in a first asset group and a third asset in a third asset group. The first asset group and the third asset group are associated with a similar logical customer organization. The first user is to use a second login ID to access an asset in a second asset group. The second asset group is associated with a logical customer organization different than the logical customer organization associated with the first and third asset groups.

It may be noted that although the examples described above refer to a customer, the service provider may have agreements with multiple customers. Each of the multiple customers may be associated with their own set of logical customer organizations, and the users of these multiple customers may use the same portal to access assets associated with their appropriate logical customer organizations.

While some specific embodiments of the invention have been shown the invention is not to be limited to these embodiments. For example, several specific modules have been shown. Each module performs a few specific functions. However, all of these functions could be grouped into one module or even broken down further into scores of modules. Most functions performed by electronic hardware components may be duplicated by software emulation and vice versa.

The different functions described herein may be performed by hardware, software, or a combination of both. The portions of that function implemented in software are stored on the machine-readable medium and have executable instruction to cause the machine to carry out that function. The invention is to be understood as not limited by the specific embodiments described herein, but only by scope of the appended claims.

We claim:

1. A system for managing assets in a data center co-location facilities environment, the system comprising:
   a central relational database containing information associated with assets of a service provider, wherein the assets are associated with one or more geographically distinct co-location facilities,
   wherein the assets are provided by the service provider for use by a customer, and wherein the service provider is associated with the customer based on one or more agreements to enable the customer to access the assets,
   wherein a permissions model is configured to enable at least one user from the customer to be designated as having authority to grant permissions to access the assets, the permissions granted to other users of the same customer,
   wherein an asset hierarchical model is configured to enable grouping of the assets in one or more asset groups, and a user group model is configured to enable grouping of the users of the customer in one or more user groups and according to the geographically distinct co-location facilities, the user groups and the asset groups managed independently of one another,
   wherein many-to-many relationships are established among the users in the user groups, the assets in the asset groups, and the permissions granted to the users to use the assets, and
   wherein components of the system are implemented in hardware, software, or a combination of both, and where components of the system that are implemented in software are stored in an executable format on one or more non-transitory machine-readable mediums.

2. The system of claim 1, wherein the at least one user from the customer to be designated as having the authority to grant permissions to the assets is an administrator responsible for managing the assets at an asset level, and wherein that designated user is authorized to administer over one of (1) a single asset group, (2) all of the asset groups, and (3) some subsets of all of the asset groups.

3. The system of claim 1, wherein the one or more asset groups are associated with one or more co-location facilities, and wherein permissions granted to an asset at a first level of the hierarchy model includes permissions granted to other assets at levels lower than the first level in the hierarchy model.

4. The system of claim 3, wherein the other assets at the levels lower than the first level in the hierarchy model is limitable to less than a total number of assets included in the levels lower than the first level.

5. The system of claim 1, wherein the agreements are grouped into two or more agreement groups, wherein a first agreement group is associated with a first logical customer organization and a second agreement group is associated with a second logical customer organization, and wherein each logical customer organization is associated with at least one asset group and at least one user group.

6. The system of claim 5, wherein a first user is a member of at least one user group, and wherein an asset is a member of at least one asset group.

7. The system of claim 1, wherein the assets include logical and physical assets, and wherein a user interface is configured to display information related to logical assets granted to a first user according to permissions granted to the first user, the user interface associated with a portal of the service provider.

8. The system of claim 7, wherein the user interface is presented to the first user based on the first user logging into the portal of the service provider using a browser installed in a client computer system connected to a network in a client-server environment.

9. The system of claim 1, wherein the assets are associated with one or more data centers of the one or more geographically distinct co-location facilities, and wherein the designated user is further authorized to revoke permissions to access the assets.

10. A method for managing assets in a data center co-location facilities environment, the method comprising:
   applying a permissions model to enable at least one user from a customer to be designated as an asset administrator having authority to grant or restrict permissions to access assets of a service provider in one or more geographically distinct co-location facilities, the permissions applied to other users of the same customer;
   applying a logical customer organization model to enable grouping of one or more agreements between the customer and the service provider, the agreements enabling the users of the customer to access the assets of the service provider;
   applying an asset hierarchical model to enable grouping of the assets in one or more asset groups and according to the logical customer organization model;
   establishing relationships among the users in the user groups, the assets in the asset groups, and the permissions granted by the asset administrator to the users; and
   presenting information related to the relationships to the users via a user interface associated with a portal of the service provider.

11. The method of claim 10, wherein information related to the assets, the users and the permissions is stored in a central relational database associated with the service provider, and wherein the presentation of the information related to the relationships to the users is based on the users logging on to the portal of the service provider.

12. The method of claim 10, wherein the administrator is responsible for managing the assets at an asset level and authorized to administer over a single asset group, all of the asset groups, or some subsets of all of the asset groups.

13. The method of claim 10, wherein the one or more asset groups are associated with one or more co-location facilities, and wherein permissions granted to an asset at a first level of the hierarchy model includes permissions granted to other assets at levels lower than the first level in the hierarchy model.

14. The method of claim 13, wherein the other assets at the levels lower than the first level in the hierarchy model is limitable to less than a total number of assets included in the levels lower than the first level.

15. The method of claim 10, wherein a first user is a member of at least one user group, and wherein an asset is a member of at least one asset group, wherein the agreements are grouped into one or more agreement groups, wherein each agreement group is associated with a logical customer organization, and wherein each logical customer organization is associated with at least one asset group and at least one user group.

16. The method of claim 15, wherein the first user is to use a first login identification (ID) to access a first asset and a second asset in a first asset group of a first co-location facility and a third asset in a third asset group of a second co-location facility geographically distinct from the first co-location facility, wherein the first asset group and the third asset group are associated with a similar logical customer organization, and wherein the first user is to use a second login ID to access an asset in a second asset group, wherein the second asset group is associated with a logical customer organization different than the logical customer organization associated with the first and third asset groups.

17. The method of claim 10, wherein the assets include physical and logical assets associated with one or more data centers of the one or more geographically distinct co-location facilities, and wherein the user interface is presented to a first user based on the first user logging into the portal of the service provider using a browser installed in a client computer system connected to a network in a client-server environment.

18. A non-transitory computer-readable media that stores instructions, which when executed by a machine, cause the machine to perform operations comprising:
   applying a permissions model to enable at least one user from a customer to be designated as an administrator having authority to grant or restrict permissions to access assets of a service provider in one or more geographically distinct data center co-location facilities, the permissions applied to other users of the same customer, wherein the administrator is responsible for managing the assets at an asset level and authorized to administer over a single asset group, all of the asset groups, or some subsets of all of the asset groups;
   applying a logical customer organization model to enable grouping of one or more agreements between the customer and a service provider, the agreements enabling the users of the customer to access the assets of the service provider;
   applying an asset hierarchical model to enable grouping of the assets in one or more asset groups and according to the logical customer organization model; and establishing relationships among the users in the user groups, the assets in the asset groups, and the permissions granted by the asset administrator to the users.

19. The computer readable medium of claim 18, wherein information related to the relationships among the users in the user groups, the assets in the asset groups, and the permissions granted by the asset administrator to the users is presented to the users via a user interface associated with a portal of the service provider, and wherein information related to the assets, the users and the permissions is stored in a central relational database associated with the service provider.

* * * * *